(12) United States Patent
Gundam et al.

(10) Patent No.: US 9,226,099 B2
(45) Date of Patent: *Dec. 29, 2015

(54) COMMUNICATING WITH AN OWNER OF AN OBJECT WITHOUT THE OWNER'S CONTACT INFORMATION

(71) Applicant: Lenovo Enterprise Solutions (Singapore) Pte. Ltd., Singapore (SG)

(72) Inventors: Raghuswamyreddy Gundam, Austin, TX (US); Karthik Kolavasi, Austin, TX (US); Douglas W. Oliver, Round Rock, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,006

(22) Filed: Apr. 18, 2014

(65) Prior Publication Data

US 2015/0304801 A1  Oct. 22, 2015

(51) Int. Cl.
*H04W 4/00* (2009.01)
*H04W 4/12* (2009.01)
*H04B 5/04* (2006.01)

(52) U.S. Cl.
CPC ............... *H04W 4/008* (2013.01); *H04W 4/12* (2013.01); *H04B 5/04* (2013.01)

(58) Field of Classification Search
CPC .......... H04M 1/6091; H04M 3/42008; H04M 3/42382; H04W 4/008; H04W 12/02; H04W 4/12; H04W 4/14; H04L 63/0407; H04L 2209/80; H04L 2209/84
USPC ....................................................... 455/466
See application file for complete search history.

(56) References Cited

U.S. PATENT DOCUMENTS 5,822,682 A  10/1998  Schroderus et al.
8,285,439 B2  10/2012  Hodges
(Continued)

FOREIGN PATENT DOCUMENTS

DE  102010001006 A1  7/2011

OTHER PUBLICATIONS

Wikipedia, "Cellular Repeater", Cellular repeater—Wikipedia, the free encyclopedia, http://en.wikipedia.org/wiki/Cellular_repeater, Oct. 22, 2013, 7 pages.

(Continued)

*Primary Examiner* — George Eng
*Assistant Examiner* — Nam Huynh
(74) *Attorney, Agent, or Firm* — Katherine S. Brown; Jeffrey L. Streets

(57) ABSTRACT

A computer program product includes a computer readable storage medium having program instructions embodied therewith, where the program instructions are executable by a processor to cause the processor to perform a method of communication. The method includes a communication hub receiving a message via short range wireless communication directly from a first mobile communication device that is proximate to the communication hub at the time the message is transmitted, and the communication hub receiving the message and automatically forwarding the message via a mobile communications network to a second mobile communication device that is associated with the communication hub without the first mobile communication device identifying the second mobile communication device.

18 Claims, 5 Drawing Sheets

(56) References Cited

U.S. PATENT DOCUMENTS

| | | | |
|---|---|---|---|
| 2009/0066488 A1* | 3/2009 | Qiahe et al. | 340/426.1 |
| 2009/0154706 A1* | 6/2009 | Lee | 380/278 |
| 2012/0109690 A1 | 5/2012 | Weinrauch et al. | |
| 2012/0116661 A1* | 5/2012 | Mizrachi | 701/300 |
| 2013/0144460 A1 | 6/2013 | Ricci | |
| 2013/0146655 A1* | 6/2013 | Gandhi | H04L 63/0407 235/375 |
| 2013/0197945 A1 | 8/2013 | Anderson | |
| 2014/0120877 A1* | 5/2014 | Chin | H04W 12/02 455/411 |
| 2015/0099508 A1* | 4/2015 | Lax | A47G 29/1214 455/420 |

OTHER PUBLICATIONS

Scheele et al., Car accident information providing method for insurance company, 2 involves information about accident is transmitted from sensor to data processing unit of driverless car 3 by communication module of car over network connection (en), DE102010001006 A1, English Abstract, Jul. 21, 2011, 9 pages.

Mark Morley, "All About B2B—Nissan Develops EV Based Mobile Communications Hub" Strength in Information. All Things B2B e-Commerce, Nissan Develops EV Based Mobile Communications Hub—All About B2B, http://www.gxsblogs.com/morleym/2009/07/nissan-develops-ev-based-mobile-communications, Jul. 29, 2009, 6 pages.

Gerhard Goos et al., "Lecture Notes in Computer Science 8030", Commenced Publication in 1973 Founding and Former Series Editors: Gerhard Goos, Juris Hartmanis, and Jan van Leeuwen, First International Conference, Las Vegas, NV, USA, Jul. 21-26, 2013, 3 pages.

Fuming Shih et al., "Understanding People's Preferences for Disclosing Contextual Information to Smartphone Apps", Massachusetts Institute of Technology, Springer-Verlag Berlin Heidelberg Jul. 2013, pp. 186-196.

"OSR's ntdev List: Question for TPM support in win8", Mar. 14, 2012, 1 page.

Automotive World "Metalworking Fluid Specialist—Smartphone apps for electric cars", BMW Group, Electric Vehicles, Electronics, OEMs and Markets, United States Posted in: Electronics News Releases, eMobility News Releases, News Releases, Smartphone apps for electric cars >> Automotive World, http://www.automotiveworld.com/news-releases/smartphone-apps-for-electric-cars/, May 6, 2013, 2 pages.

* cited by examiner

80 ⬈

82

A first mobile communication device transmits a message via short range wireless communication directly to a communication hub that is proximate to the first communication device at the time the message is transmitted

↓

84

The communication hub receives the message and automatically forwards the message via a mobile communications network to a second mobile communication device that is associated with the communication hub, wherein the message from the first mobile communication device is automatically forwarded to the second mobile communication device without the first communication device identifying the second mobile communication device

FIG. 5

COMMUNICATING WITH AN OWNER OF AN OBJECT WITHOUT THE OWNER'S CONTACT INFORMATION

BACKGROUND

1. Field of the Invention

The present invention relates to wireless communication systems and methods, including communications between first and second wireless communication devices.

2. Background of the Related Art

Mobile communication devices, often referred to as mobile phones, cell phones or smart phones, are able to communicate over a cellular communication network from any point within the area covered by the cellular communication network. When the mobile communication device passes from one region (a cell) to another region (another cell), an ongoing communication session is passed from one cell tower to the next without interrupting the session. Each cell tower has a transceiver for receiving and transmitting wireless communication signals among mobile communication devices or with a public switched telephone network.

Modern mobile communication devices are able to make telephone calls, as well as send and receive text messages, send and receive email messages, play music and games, search the World Wide Web, and run a wide variety of applications. A mobile communication device typically includes an interface for storing a list of contacts, which includes contact information for people that the owner of the mobile communication device may wish to contact. Each entry in the contacts may include a name of the person or business, one or more address, one or more phone number, and an email address. In order to communicate with the person, the user of the mobile communication device may select the contact and touch the contact information that they wish to use. However, if the user doesn't have the contact information stored in the mobile communication device, such contact information must be manually entered. Unknown contact information may be obtained by performing a search using a browser application. Still, there are situations when it is difficult or impossible to compose a search that will locate the necessary contact information using available information.

BRIEF SUMMARY

One embodiment of the present invention provides a computer program product comprising a computer readable storage medium having program instructions embodied therewith, where the program instructions are executable by a processor to cause the processor to perform a method. The method comprises a communication hub receiving a message via short range wireless communication directly from a first mobile communication device that is proximate to the communication hub at the time the message is transmitted, and the communication hub receiving the message and automatically forwarding the message via a mobile communications network to a second mobile communication device that is associated with the communication hub without the first mobile communication device identifying the second mobile communication device.

BRIEF DESCRIPTION OF THE SEVERAL VIEWS OF THE DRAWINGS

FIG. 5 is a flowchart of a method in accordance with one embodiment of the present invention.

DETAILED DESCRIPTION

Figure 1:
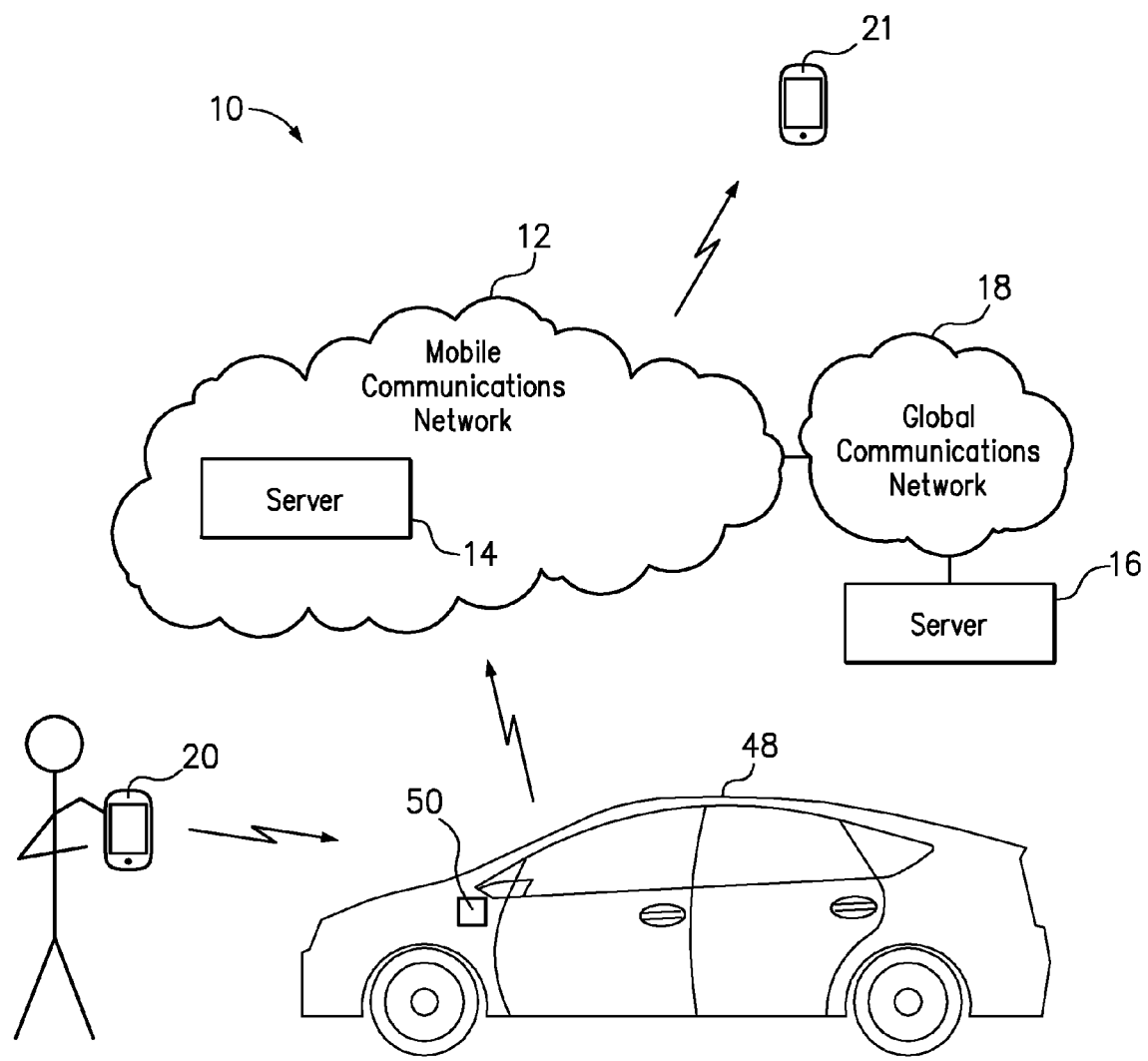
FIG. 1 is a diagram of a system consistent with one or more embodiments of the present invention.

One embodiment of the present invention is a method, comprising a communication hub receiving a message via short range wireless communication directly from a first mobile communication device that is proximate to the communication hub at the time the message is transmitted, and the communication hub receiving the message and automatically forwarding the message via a mobile communications network to a second mobile communication device that is associated with the communication hub without the first mobile communication device identifying the second mobile communication device.

A communication hub is a communication device having much the same function as a mobile communication device, except that there is no need for most of the user interface capabilities since it is programmed or designed to automatically forward communications between first and second mobile communication devices. Most preferably, the communication hub communicates over a short range wireless communication protocol with previously unidentified devices in close proximity and communicates over a mobile communication network with a predetermined mobile communication device. It is expected that the communication hub and the predetermined device (i.e., the second mobile communication device) will be owned and operated by the same user, who has setup the communication hub to forward messages from previously unknown devices. The first and second mobile communication devices may be mobile phones, tablet or notebook computers, or other specialty electronics having similar wireless communication capabilities.

The short range wireless communication may use, without limitation, ultra-high frequency (UHF) radio frequencies. UHF radio signals typically use electromagnetic waves in the range between 300 MHz and 3,000 MHz (3 GHz). One preferred standard for short range wireless communication is known as BLUETOOTH. Alternatively, the short range wireless communication could use a near field communication (NFC) standard, although such communications are typically limited to distances of no more than a few inches. For example, the short range wireless communication may also include use of a radio frequency identification (RFID) type communication standard.

The mobile communications network may include a cellular telephone network, a satellite telephone network, or both. Cell towers in a mobile communication network can send and receive signals from a mobile communication device for many miles. A satellite telephone can send and receive signals over most of the earth.

In another embodiment, the mobile communication network accesses a stored association between the communication hub and the second mobile communication device, such that any message that the network receives from the communication hub may be automatically forwarded to the second mobile communication device without the communication hub having to identify the second mobile communication device. One benefit of this implementation is that the communication hub does not need to store contact information for the second mobile communication device and such contact information cannot be hacked.

In yet another embodiment, the association between the communication hub and the second mobile communication device is stored by a third party server that is accessible over a global communication network, such as the Internet. In this method, the communication hub identifies an address to a server within a global communication network and forwards that address to the mobile communication network along with the message. The mobile communication network may then forward the message and the identity of the communication hub to the server at the identified address over the global communication network. Upon receiving the message and the identity of the communication hub, the server can access a stored association between the communication hub and the second mobile communication device and send the message to the second mobile communication device via the mobile communication network.

While the invention may involve one way communication of the message from the first mobile communication device to the second mobile communication device, the invention may further include reply communications from the second mobile communication device to the first communication device. Furthermore, the reply communications may occur with or without providing contact information for the second mobile communication device to the first mobile communication device. For example, after the second mobile communication device receives the message via the mobile communication network, the second mobile communication device may send a reply message to the communication hub via the mobile communication network. When the communication hub receives the reply message, the communication hub may then automatically transmit the reply message via a short range wireless communication to the first mobile communication device. Preferably, the communication hub stores some identification of the first mobile communication device when receiving the original message from the first mobile communication device, then uses that same identification to send the reply message to the first mobile communication device. Such identification may be as little as an ongoing short range wireless connection, such as a BLUETOOTH connection.

Still further, the second mobile communication device may transmit an instruction to the communication hub via the mobile communication network, wherein the instruction instructs the communication hub to transmit contact information for the second user to the first mobile communication device via short range wireless communication. In response to receiving the instruction, the communication hub transmits the contact information for the second user to the first mobile communication device via short range wireless communication. Optionally, the contact information for the second user may have been previously stored in memory of the communication hub, or the contact information for the second user may be transmitted to the communication hub along with the instruction. The contact information may include, without limitation, a telephone number for the second communication device. More generally, the second communication device may remotely enable the communication hub to communicate information to the first mobile communication device, wherein the information was previously stored in memory accessible to the communication hub.

Embodiments of the communication hub may be physically secured to or disposed in a valuable item that may be lost, stolen, or temporarily left alone. Examples of such a valuable item include, without limitation, a vehicle, a trailer, boat, briefcase or computer. When the communication hub is integrated into the valuable item, such as a vehicle, power may be automatically provided to the communication hub when the vehicle is turned off. In various embodiments, the second mobile communication device may transmit an instruction to the communication hub to cause the communication hub to shut down.

Other embodiments of the invention may further include security measures to avoid receiving unwanted messages, such as advertisements, spam and solicitations. For example, a trusted third party may be used to establish a trust relationship between the first mobile communication device and the communication hub. Methods used to obtain and use a digital certificate from a certificate authority are well known in the art. These or other methods may be used to prohibit certain entities or classes of entities from communicating with the communication hub, or specifically allowing only certain entities or classes of entities to communicate with the communication hub. In one example, a person wanting to send the information to the owner of a vehicle will register his identification information with a signing authority who will provide his mobile communication device with a digital certificate. When the person's mobile communication device communicates a message to a communication hub within the vehicle, the digital certificate is passed along with the message. The communication hub in the vehicle validates the digital certificate and records the person's identification information. Based on the identification information received, the communication hub can allow certain people or entities (e.g. police, individuals) to contact the owner or prohibit certain people or entities (e.g., bad neighbors or advertising companies) from contacting the owner.

As one example, the invention may be beneficially used when a vehicle with a communication hub has been hit by another vehicle in a parking lot. It is common in such situations, for the offending party to leave a written note with their contact information under the windshield wiper so that the vehicle owner can later contact the offending party to deal with the damages or obtain insurance policy information. Using an embodiment of the present invention, the offending party may communicate a message to the vehicle owner via a communication hub within the damaged vehicle. The same methods may be used to contact the owner of a vehicle that is blocking your driveway, is being issued a parking ticket, or some other situation.

One embodiment of the present invention provides a computer program product comprising a computer readable storage medium having program instructions embodied therewith, where the program instructions are executable by a processor to cause the processor to perform a method. The method comprises a communication hub receiving a message via short range wireless communication directly from a first mobile communication device that is proximate to the communication hub at the time the message is transmitted, and the communication hub receiving the message and automatically forwarding the message via a mobile communications network to a second mobile communication device that is associated with the communication hub without the first mobile communication device identifying the second mobile communication device.

The foregoing computer program products may further include computer readable program code for implementing or initiating any one or more aspects of the methods described herein. Accordingly, a separate description of the methods will not be duplicated in the context of a computer program product.

FIG. 1 is a diagram of a system 10 consistent with one or more embodiments of the present invention. A person having a first mobile communication device 20 is in the proximity of a vehicle 48 having a communication hub 50, such that the first mobile communication device 20 can communicate a message to the communication hub 50 using a short range communication protocol, such as BLUETOOTH. The communication hub 50 is also able to forward the message to a second mobile communication device 21, which may be the same or similar to the first mobile communication device 20, but is owned and operated by a person that also owns and operates the communication hub 50 and presumably the vehicle 48. The communication hub 50 forwards the message to the second mobile communication device 21 through the mobile communication network 12.

In accordance with one option, a server 14 may store an association between the communication hub 50 and the second mobile communication device 21, such that any message received from the communication hub may be forwarded to the second mobile communication device. In accordance with a second option, the association between the communication hub 50 and the second mobile communication device 21 may be stored on another server 16 that is accessible at an address, such as an Internet Protocol (IP) address, over a global communications network 18, such as the Internet. Other aspects, features and functions described in relation to the present invention may be implemented, for example, in a system such as the system 10 as shown.

Figure 2:
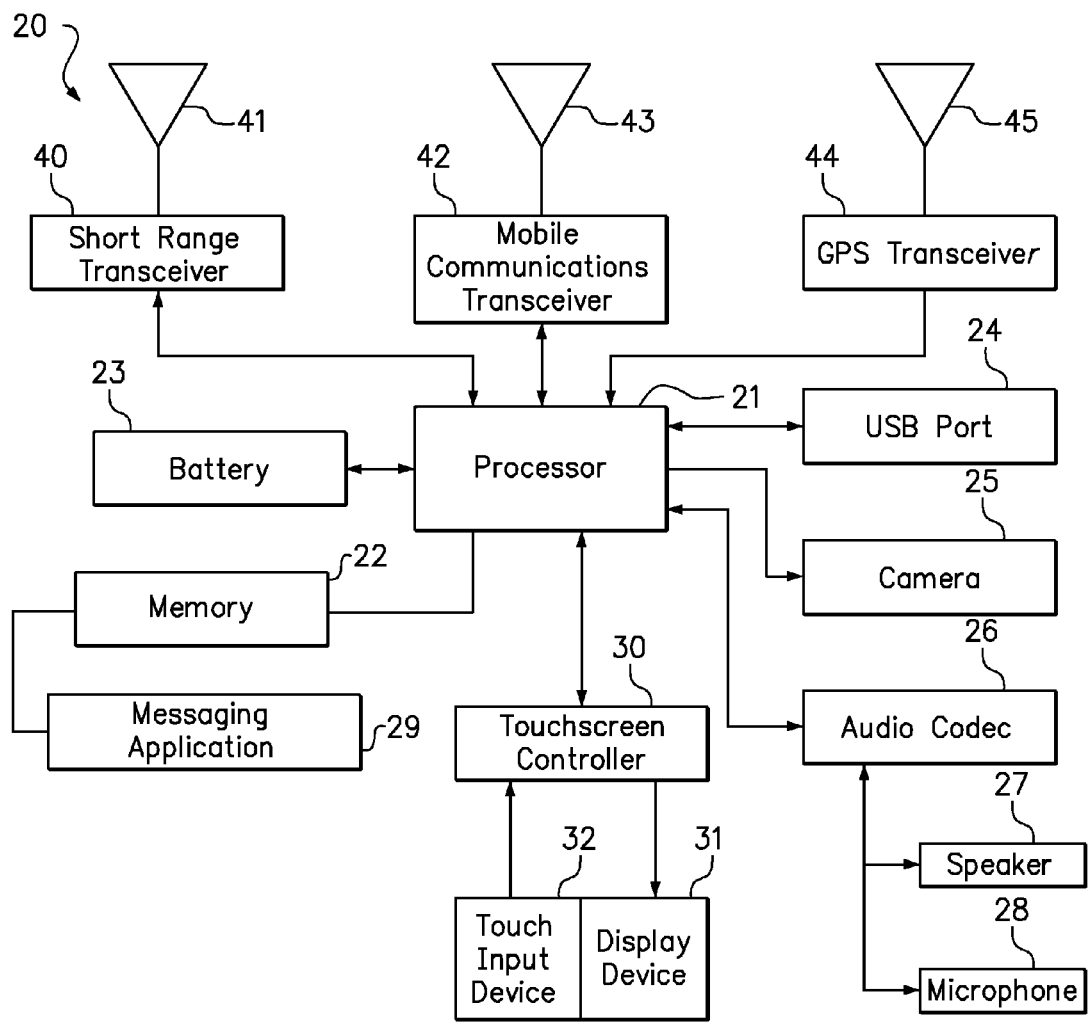
FIG. 2 is a diagram of a mobile communication device.

FIG. 2 is a diagram of the components of a mobile communication device 20, such as a smart phone, capable of implementing one embodiment of the invention. The mobile device 20 may include a processor 21, memory 22, a battery 23, a universal serial bus (USB) port 24, a camera 25, and an audio codec 26 coupled to a speaker 27, a microphone 28. The mobile communication device 20 may further include a touchscreen controller 30 which provides a graphical output to the display device 31 and an input from a touch input device 32. Collectively, the display device 31 and touch input device 32 may be referred to as a touchscreen.

The mobile communication device 20 may also include a Wi-Fi and/or Bluetooth transceiver 40 and corresponding antenna 41 allowing the device to communicate with a Bluetooth enabled device, a mobile communication transceiver 42 and corresponding antenna 43 allowing the device to communicate over a mobile/cellular communication network, and a global positioning system (GPS) transceiver 44 and corresponding antenna 45 allowing the device to obtain signals from a global positioning system or satellites. As shown, the memory 22 stores a messaging application 29 for sending and receiving messages and/or instructions.

Figure 3:
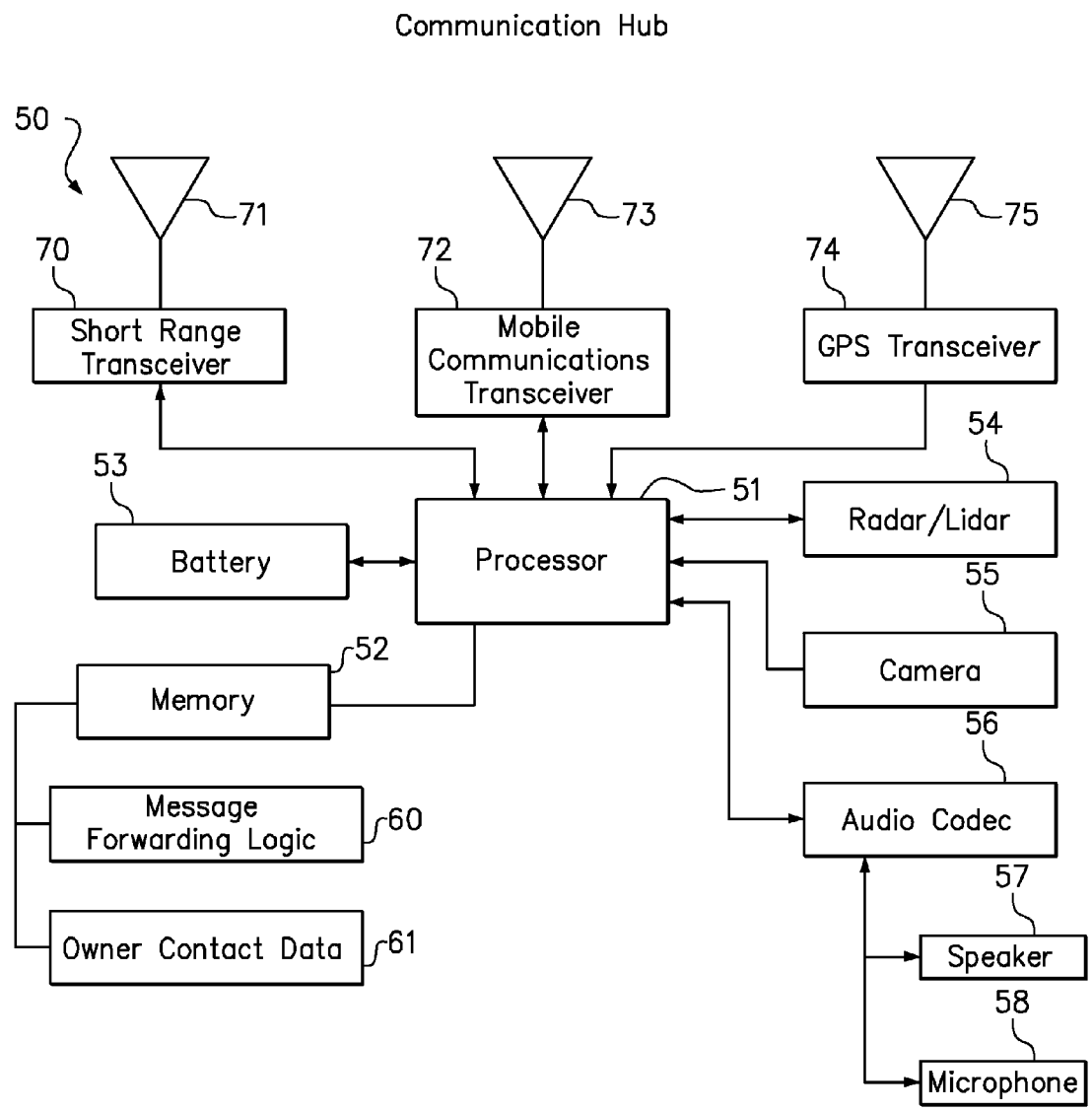
FIG. 3 is a diagram of a communication hub.

FIG. 3 is a diagram of a communication hub or computer system 50 controlling an autonomous vehicle. The communication hub 50 may include a processor 51, memory 52, a DC power source or battery 53, a Radar or Lidar unit 54, one or more cameras 55, and an audio codec 56 coupled to a speaker 57 and a microphone 58. The system 10 may also include a short range wireless transceiver 70 and corresponding antenna 71 allowing the system to communicate with the first mobile communication device 20 (See FIG. 1), a mobile communications transceiver 72 and corresponding antenna 73 allowing the system to communicate over a mobile communication network 12 (See FIG. 1), and an optional global positioning system (GPS) transceiver 74 and corresponding antenna 75 allowing the communication hub to identify and report its current location. As shown, the memory 52 stores message forwarding logic 60 and optional owner contact data 61. In accordance with certain embodiments of the present invention, the communication hub 50 executes the message forwarding logic 60 to manage communications with a first mobile communication device using the short range transceiver 70 and manage communications with a second mobile communication device using the mobile communications transceiver 72. Optionally, the message forwarding logic 60 may be programmed so that the communication hub 50 can provide the owner contact data 61 to a first mobile communication device upon receiving such an instruction from the second mobile communication device.

Figure 4:
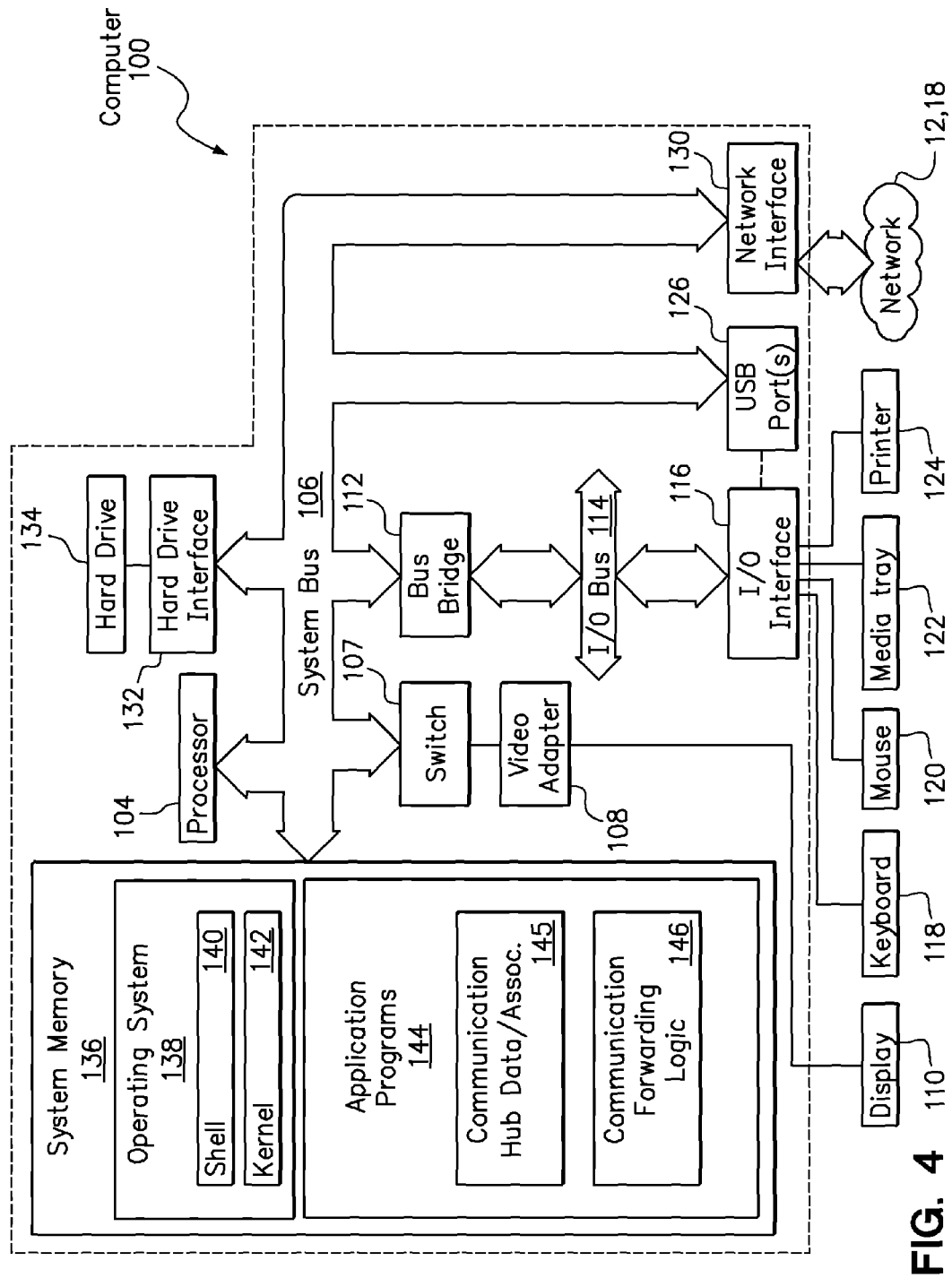
FIG. 4 is a diagram of an exemplary compute node or server.

FIG. 4 is a diagram of an exemplary compute node or server (or simply "computer") 100 that may be utilized as the server 14 in the mobile communications network 12 or the server 16 in the global communications network 18, consistent with embodiments of the present invention. Note that some or all of the exemplary architecture, including both depicted hardware and software, shown for and within computer 100 may be implemented in one of the servers 14, 16 as shown in FIG. 1.

The computer 100 includes a processor unit 104 that is coupled to a system bus 106. Processor unit 104 may utilize one or more processors, each of which has one or more processor cores. In one embodiment, a switch 107 may couple the video adapter 108 to the system bus 106. The system bus 106 is coupled via a bus bridge 112 to an input/output (I/O) bus 114, and an I/O interface 116 is coupled to I/O bus 114. The I/O interface 116 affords communication with various I/O devices, including a keyboard 118, a mouse 120, a media tray 122 (which may include storage devices such as CD-ROM drives, multi-media interfaces, etc.), a printer 124, and an external USB port(s) 126. While the format of the ports connected to I/O interface 116 may be any known to those skilled in the art of computer architecture, in a preferred embodiment some or all of these ports are universal serial bus (USB) ports. As shown, the computer 100 is able to communicate over a network using a network interface 130. The network may be an external network such as the mobile communication network 12 or global communication network 18, and perhaps also an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory may include additional higher levels of volatile memory (not shown), including, but not limited to, cache memory, registers and buffers. Data that populates the system memory 136 includes the operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for the OS 138, including providing essential services required by other parts of the OS 138 and application programs 144, including memory management, process and task management, disk management, and mouse and keyboard management. The application programs 144 in the system memory of computer 100 may include various programs and modules for implementing the methods described herein, such as communication hub data and associations 145 and message forwarding logic 146. The communication hub data and associations 145 provides an identification for the communication hub and associates the communication hub with a second mobile communication device. Typically, the communication hub and the associated second mobile communication device will be owned and operated by the same person or entity. The message forwarding logic 146 manages the receipt of messages, uses the communication hub identification as to identify the associated second mobile communication device, The hardware elements depicted in the computer 100 are not intended to be exhaustive, but rather are representative components suitable to perform the processes of the present invention. For instance, the computer 100 may include alternate memory storage devices such as magnetic cassettes, digital versatile disks (DVDs), Bernoulli cartridges, and the like. These and other variations are intended to be within the spirit and scope of the present invention.

FIG. 5 is a flowchart of a method 80 in accordance with one embodiment of the present invention. In step 82, a first mobile communication device transmits a message via short range wireless communication directly to a communication hub that is proximate to the first mobile communication device at the time the message is transmitted. In step 84, the communication hub receives the message and automatically forwards the message via a mobile communications network to a second mobile communication device that is associated with the communication hub, wherein the message from the first mobile communication device is automatically forwarded to the second mobile communication device without the first mobile communication device identifying the second mobile communication device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith, the program instructions executable by a processor to cause the processor to perform a method comprising:

a communication hub receiving a message via short range wireless communication directly from a first mobile communication device that is proximate to the communication hub at the time the message is transmitted;

the communication hub automatically forwarding the message via a mobile communications network to a second mobile communication device that is associated with the communication hub without the first mobile communication device identifying the second mobile communication device;

the communication hub identifying an address to a server within a global communication network and forwarding that address to the mobile communication network along with the message;

the mobile communication network forwarding the message to the server at the identified address over the global communication network; and the server accessing a stored association between the communication hub and the second mobile communication device and sending the message to the second mobile communication device via the mobile communication network.

2. The computer program product of claim 1, wherein the short range wireless communication uses ultra-high frequency radio frequencies.

3. The computer program product of claim 1, wherein the short range wireless communication uses near field communication.

4. The computer program product of claim 1, wherein the mobile communications network is a cellular telephone network.

5. The computer program product of claim 1, wherein the mobile communications network is a satellite telephone network.

6. The computer program product of claim 1, wherein the method further comprises:

the mobile communication network accessing a stored association between the communication hub and the second mobile communication device, wherein any message received from the communication hub is automatically forwarded to the second mobile communication device without the communication hub identifying the second mobile communication device.

7. A computer program product comprising a non-transitory computer readable storage medium having program instructions embodied therewith, the program instructions executable by a processor to cause the processor to perform a method comprising:

a communication hub receiving a message via short range wireless communication directly from a first mobile communication device that is proximate to the communication hub at the time the message is transmitted;

the communication hub automatically forwarding the message via a mobile communications network to a second mobile communication device that is associated with the communication hub without the first mobile communication device identifying the second mobile communication device;

the second mobile communication device receiving the message via the mobile communication network and sending a reply message to the communication hub via the mobile communication network; and the communication hub receiving the reply message and automatically transmitting the reply message via a short range wireless communication to the first mobile communication device.

8. The computer program product of claim 7, wherein the method further comprises:
- the second mobile communication device transmitting an instruction to the communication hub via the mobile communication network, wherein the instruction instructs the communication hub to transmit contact information for the second user to the first mobile communication device via short range wireless communication; and
- the communication hub transmitting the contact information for the second user to the first mobile communication device via short range wireless communication in response to receiving the instruction.

9. The computer program product of claim 8, wherein the contact information for the second user is stored in memory of the communication hub.

10. The computer program product of claim 8, wherein the second mobile communication device transmits the contact information to the communication hub along with the instruction.

11. The computer program product of claim 8, wherein the contact information includes a telephone number.

12. The computer program product of claim 1, wherein the communication hub is physically secured to or disposed in a trailer, boat, briefcase or computer.

13. The computer program product of claim 1, wherein the communication hub is secured to or disposed in a vehicle, the method further comprising:
- automatically providing power to the communication hub when the vehicle is turned off.

14. The computer program product of claim 1, wherein the method further comprises:
- the second mobile communication device transmitting an instruction to the communication hub, wherein the instruction causes the communication hub to shut down.

15. The computer program product of claim 1, wherein the method further comprises:
- using a trusted third party to establish a trust relationship between the first mobile communication device and the communication hub.

16. The computer program product of claim 1, wherein the method further comprises:
- prohibiting certain entities or classes of entities from communicating with the communication hub.

17. The computer program product of claim 1, wherein the method further comprises:
- allowing only certain entities or classes of entities to communicate with the communication hub.

18. A computer program product comprising a non-transitory computer readable storage medium having program instructions embodied therewith, the program instructions executable by a processor to cause the processor to perform a method comprising:
- a communication hub receiving a message via short range wireless communication directly from a first mobile communication device that is proximate to the communication hub at the time the message is transmitted;
- the communication hub automatically forwarding the message via a mobile communications network to a second mobile communication device that is associated with the communication hub without the first mobile communication device identifying the second mobile communication device; and
- the second communication device remotely enabling the communication hub to communicate information to the first mobile communication device, wherein the information was previously stored in memory accessible to the communication hub.

* * * * *